(12) United States Patent
Mann et al.

(10) Patent No.: US 10,219,187 B2
(45) Date of Patent: Feb. 26, 2019

(54) METHOD AND APPARATUS TO EXPEDITE CSFB CALL SETUP TIME USING INTELLIGENT SEARCH ALGORITHM

(71) Applicant: Intel IP Corporation, Santa Clara, CA (US)

(72) Inventors: Rohit Mann, San Diego, CA (US); Ranganadh Karella, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 77 days.

(21) Appl. No.: 14/976,038

(22) Filed: Dec. 21, 2015

(65) Prior Publication Data

US 2017/0181043 A1 Jun. 22, 2017

(51) Int. Cl.
*H04W 36/00* (2009.01)
*H04W 76/18* (2018.01)

(52) U.S. Cl.
CPC ... *H04W 36/0022* (2013.01); *H04W 36/0055* (2013.01); *H04W 36/0061* (2013.01); *H04W 36/0066* (2013.01); *H04W 36/0072* (2013.01); *H04W 76/18* (2018.02)

(58) Field of Classification Search
CPC ......... H04W 36/0022; H04W 36/0061; H04W 36/0072; H04W 36/0055; H04W 36/0066; H04W 24/10; H04W 76/027; H04W 76/18
See application file for complete search history.

(56) References Cited

U.S. PATENT DOCUMENTS

| 2015/0087308 | A1* | 3/2015 | Jeong | H04W 36/0022 455/436 |
| 2015/0208285 | A1* | 7/2015 | Liao | H04W 36/0022 370/332 |
| 2015/0351011 | A1* | 12/2015 | Shukla | H04W 48/16 455/434 |
| 2016/0366619 | A1* | 12/2016 | Yang | H04W 36/0016 |
| 2016/0366622 | A1* | 12/2016 | Yang | H04W 36/0083 |
| 2017/0013510 | A1* | 1/2017 | Jung | H04W 48/10 |

* cited by examiner

*Primary Examiner* — Kwang B Yao
*Assistant Examiner* — Moo Jeong
(74) *Attorney, Agent, or Firm* — Viering, Jentschura & Partner mbB (57) ABSTRACT

A communication device and a method for circuit switched fallback (CSFB) configured to conduct inter radio access technology (RAT) measurements upon receipt of a CSFB notification and later use the information obtained from the measurements to intelligently conduct a cell selection procedure if redirection to the target RAT frequency indicated by the Evolved Universal Terrestrial Radio Access Network (EUTRAN) in a CSFB redirection request fails.

23 Claims, 8 Drawing Sheets

METHOD AND APPARATUS TO EXPEDITE CSFB CALL SETUP TIME USING INTELLIGENT SEARCH ALGORITHM

TECHNICAL FIELD

Various embodiments relate generally to circuit switched fallback (CSFB) from a long term evolution cell to a circuit switched radio access technology cell when the target radio access technology fails on the frequency indicated by the network.

BACKGROUND

The Third Generation Partnership Project (3GPP) Release 8 specifies for circuit switched fallback (CSFB) when a circuit switched (CS) transmission is delivered to a device camped on the long term evolution (LTE) network since LTE is a packet switched (PS) data based technology. By using CSFB, the device may select to a third generation (3G) radio access technology (RAT), such as the Universal Mobile Telecommunications System (UMTS), or a second generation (2G) RAT, such as the Global System for Mobile Communications (GSM), in order to receive the incoming CS transmission. Put differently, when an LTE device is used to make or receive a CS transmission such as a voice call or a short message service (SMS) text message, the LTE device will fall back to a 3G or 2G RAT in order to complete the CS transmission.

The LTE device will typically fall back to a 2G or 3G RAT network (RAN) (2G and 3G collectively, hereinafter, referred to as a "legacy RAT") on a frequency indicated by the network. However, when the fall back to the legacy RAT on the indicated frequency fails, the device may take an extended period of time in order to connect to an appropriate RAT for reception of the CS transmission.

CSFB redirection to other RATs in the present mobile telecommunication system requires the mobile device, or user equipment (UE), to attempt camping on a suitable cell according to redirectedCarrierInfo if it is included in the RRCConnectionRelease/RRCConnectionReject message. However, for cases where the UE does not find a suitable cell on the target frequency, a search for any other suitable frequency in the target RAT could take a long time and might result in a CFSB mobile originated/mobile terminated (MO/MT) call drop. In addition, during the entire search process, the end user experiences a stalled data connection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry"

in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Figure 1:
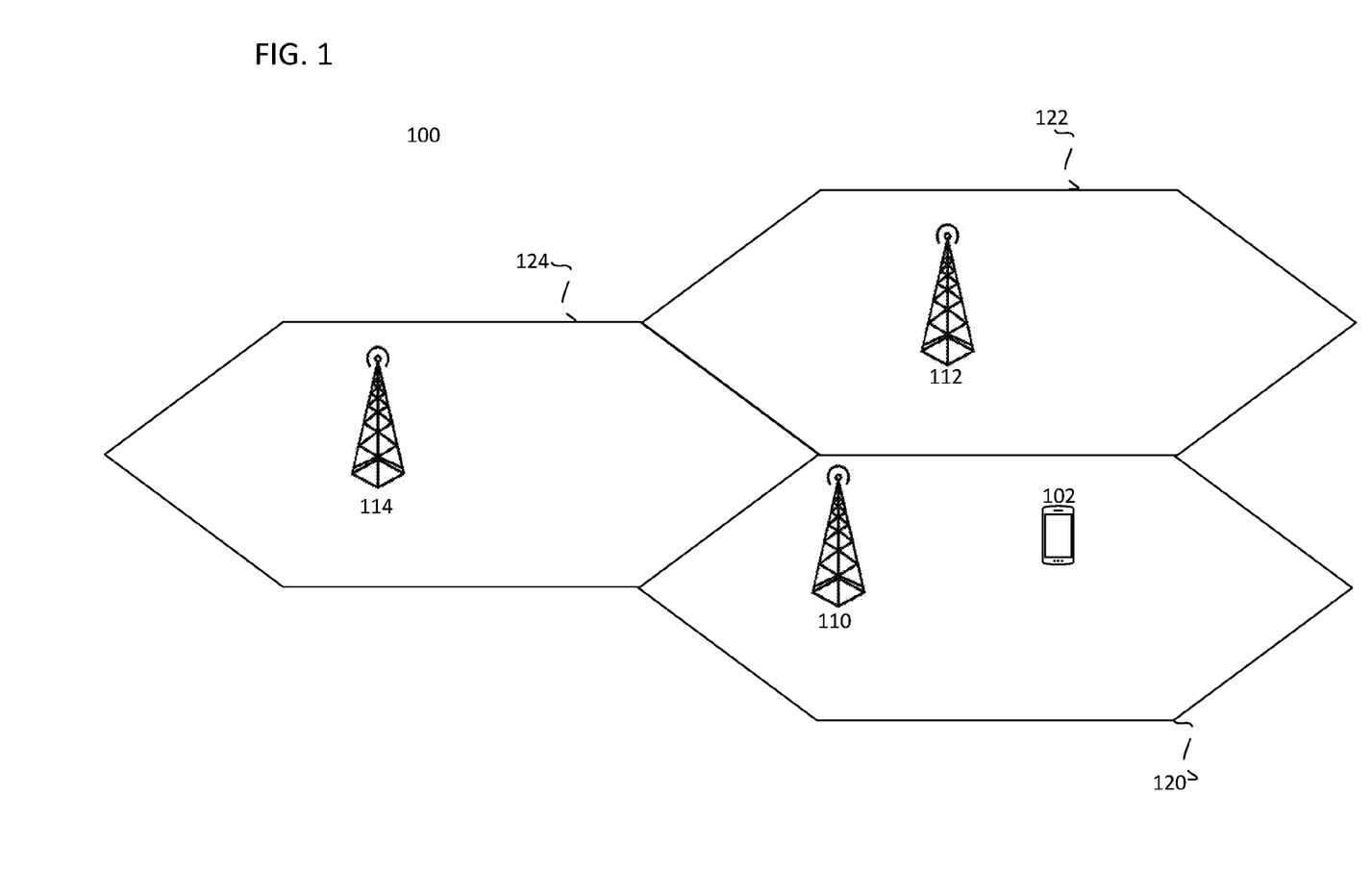
FIG. 1 shows an example of communication network in an aspect of this disclosure.

FIG. 1 shows mobile communication network 100. Mobile communication network may be include at least mobile terminal 102, base stations 110-114 and coverage regions 120-124 corresponding to base station 110, 112, and 114, respectively. It is appreciated that mobile communication network 100 is exemplary in nature and may thus be simplified for purposes of explanation.

Base stations 110-114 may each be associated with a radio access section of mobile communication 100, i.e. the Radio Access Network (RAN) of mobile communication network 100. Base stations 110-114 may thus act as an interface between the RAN of mobile communication network 100 and an underlying core network of mobile communication network 100, and may allow any proximate mobile terminals, e.g. mobile terminal 102, to exchange data with the core network of mobile communication network 100 and any further networks connected thereto.

Each of base stations 110-114 may respectively provide mobile communication coverage to coverage regions 120-124, which may correspond to a single cell (i.e. sector) of a respective one of base stations 110-114 or may be composed of multiple cells (i.e. sectors) of a respective one of base station 110-114. As shown in FIG. 1, mobile terminal 102 may be physically located within coverage regions 120 of base station 110. It is appreciated that although coverage regions 120-124 are depicted as having distinct boundaries, it is understood that one or more of coverage regions 120-124 may overlap, and accordingly there may exist geographical regions served by two or more of base stations 110-114.

As previously indicated, there may exist geographic overlap between coverage regions 120-124. For example, coverage regions 120 and 122 may substantially overlap, and accordingly mobile terminal 102 may receive wireless transmissions from both of base stations 110 and 112.

Communication Network 100 may be configured in accordance with the network architecture of any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access Wideband CDMA (W-CDMA), etc. Accordingly, base stations 110-114 may be configured to provide an interface for communication devices, such as mobile element 102, to connect with any of the aforementioned network architectures.

For example, base station 110 may be an evolved Node B (eNB) providing mobile element 102 with an interface to connect to an LTE network. In this case, base station 110 serves as the interface with the mobile management entity (MME) for the mobile terminal 102. The MIME is the key control-node for the LTE access-network. Base station 112 may serve as a base transceiver station (BTS) providing mobile element 102 with an interface to connect to a GSM network. In this case, base station 112 serves as the interface with the Mobile Switching Center Server (MSS), which is a 2G core network element which controls the network switching subsystem elements. Mobile element 102 may be camped on base station 110 (serving as an eNB in this example) and may be in idle mode. Alternatively, the mobile terminal 102 may be in connected mode and be actively receiving LTE data services. If a CS transmission is made to the mobile element 102, it will have to fall back to a legacy network in order to receive the CS transmission. In this case, mobile terminal 102 may fall back to the 2G network supported by base station 112 (serving as a BTS in this example).

Figure 2:
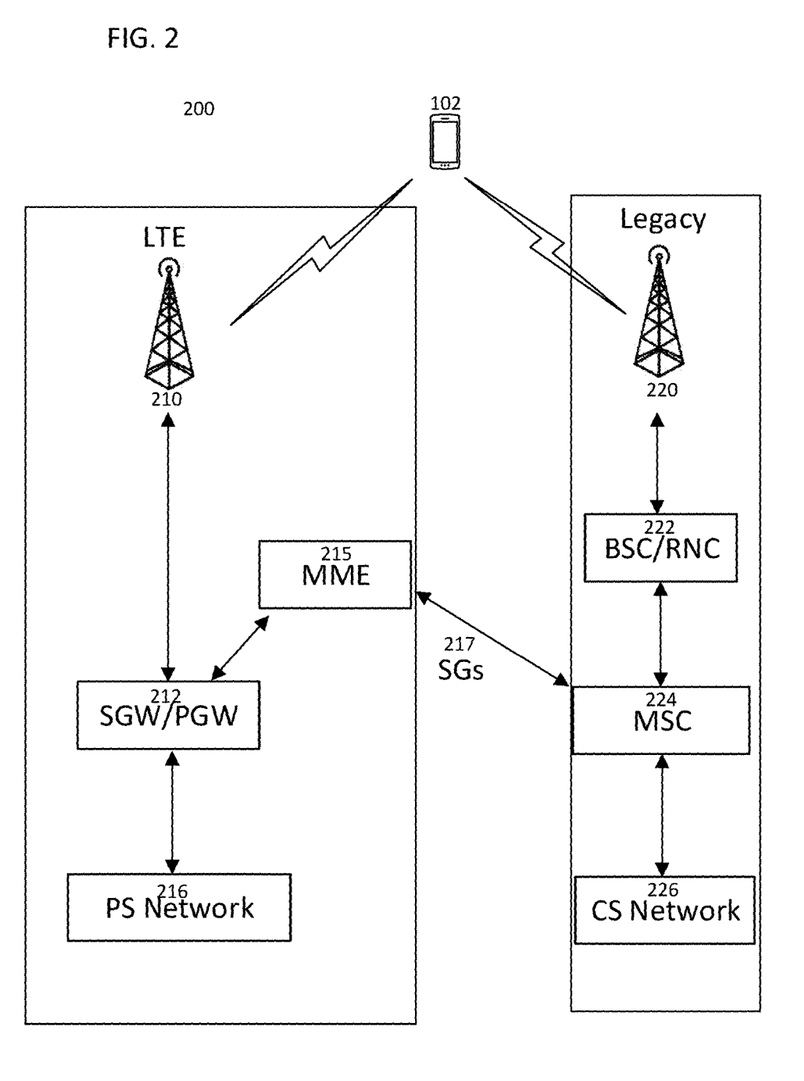
FIG. 2 shows an example of a communication network structure in an aspect of this disclosure.

FIG. 2 shows an example of a network structure 200 in an aspect of this disclosure. It is appreciated that network structure 200 is exemplary in nature and may thus be simplified for purposes of explanation.

Mobile element 102 is a device that is capable of operating on both the LTE and Legacy RAT, therefore, it is capable of CSFB.

The legacy radio access network (RAN) may consist of either a 2G (e.g. GSM) or a 3G (e.g. UMTS) RAT. In either case, base station 220 is configured to operate with the respective RAT, e.g. base station 220 is a Node B for UMTS or base station 220 is a base station transceiver station (BTS) for GSM. The Base Station Controller (BSC) or the Radio Network Controller (RNC) (BSC/RNC) 222 are the governing elements in the GSM and UMTS RANs, respectively, and are responsible for controlling the base station that are connected to it. The Mobile Switching Center (MSC) 224 is the primary service delivery node for legacy networks and is responsible for routing voice calls and texting services in addition to other CS services. It provides the interface to the CS network 226.

In the LTE RAN, the base station 210 may be an eNB. The Serving Gateway (SGW) and the packet data network gateway (PGW) (collectively, SGW/PGW) 212 serve as the interface to the packet switch (PS) network 216. The SGW routes and forwards user data packets in addition to acting as a mobility anchor for the data plane during inter-ENB handovers and as the anchor for mobility between LTE and other 3GPP technologies, such as GSM or UMTS. The PGW provides connectivity from the mobile terminal 102 to external packet data networks. The SGW/PGW 212 communicate with the Mobile Management Entity (MME) 215, which is the key control node for the LTE RAN. The SGs interface 217 connects the MME 215 from the LTE RAN to the MSC 224 of the legacy network.

Whenever an incoming CM transmission (e.g. SMS message, Unstructured Supplementary Service Data (USSD) message, etc.) arrives, the mobile terminal 102 is handed over to a legacy network assuming it provides an overlapping coverage with the LTE cell that the mobile terminal is camped on.

When the mobile terminal 102 capable of CSFB is turned on, it registers in both networks, the LTE and the legacy network. When an incoming call arrives to the mobile terminal 102, the call request first arrives at the MSC 224, which the mobile terminal 102 has previously registered with. When the MSC 224 gets the call request, it sends a message to the MME 215 via the SGs interface 217. This message is forwarded to the mobile terminal 102, which is still connected to the LTE RAN. Upon accepting the call, the mobile terminal 102 sends a service request to the MME 215, which then notifies the eNB 210 to transfer it to the legacy network. In order to enable fast handover to the legacy network, when a CSFB request is made, the legacy network needs to know the location of the mobile terminal. To account for this, the MME 215 tracks the location of the user in the LTE network continuously provides the location information to the legacy MSC 224 using the SGs interface 217.

Figure 3A:
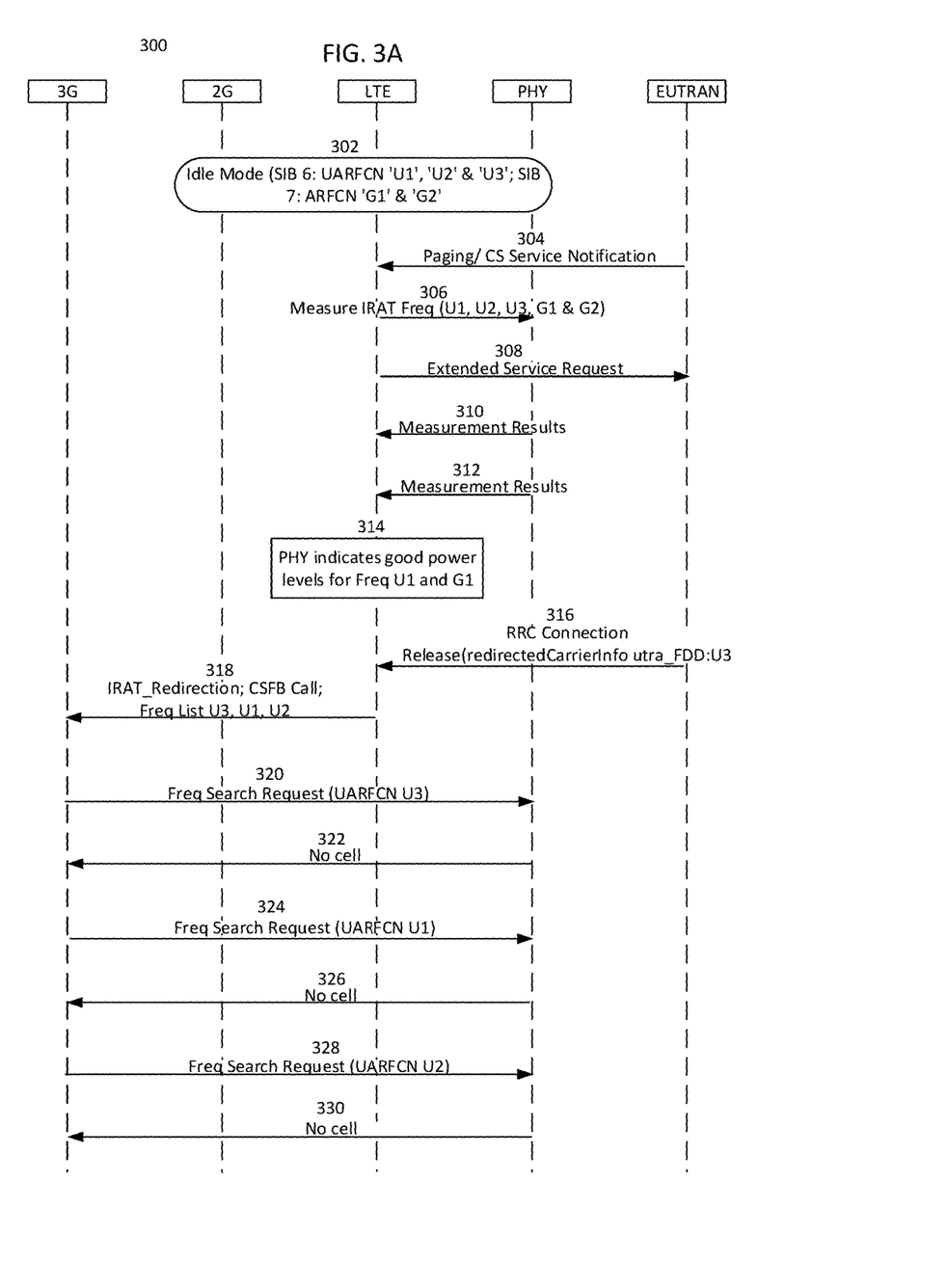
FIG. 3A shows a message sequence chart (MSC) for falling back to a legacy RAT upon a notification of a CS transmission in an aspect of this disclosure.
Figure 3B:
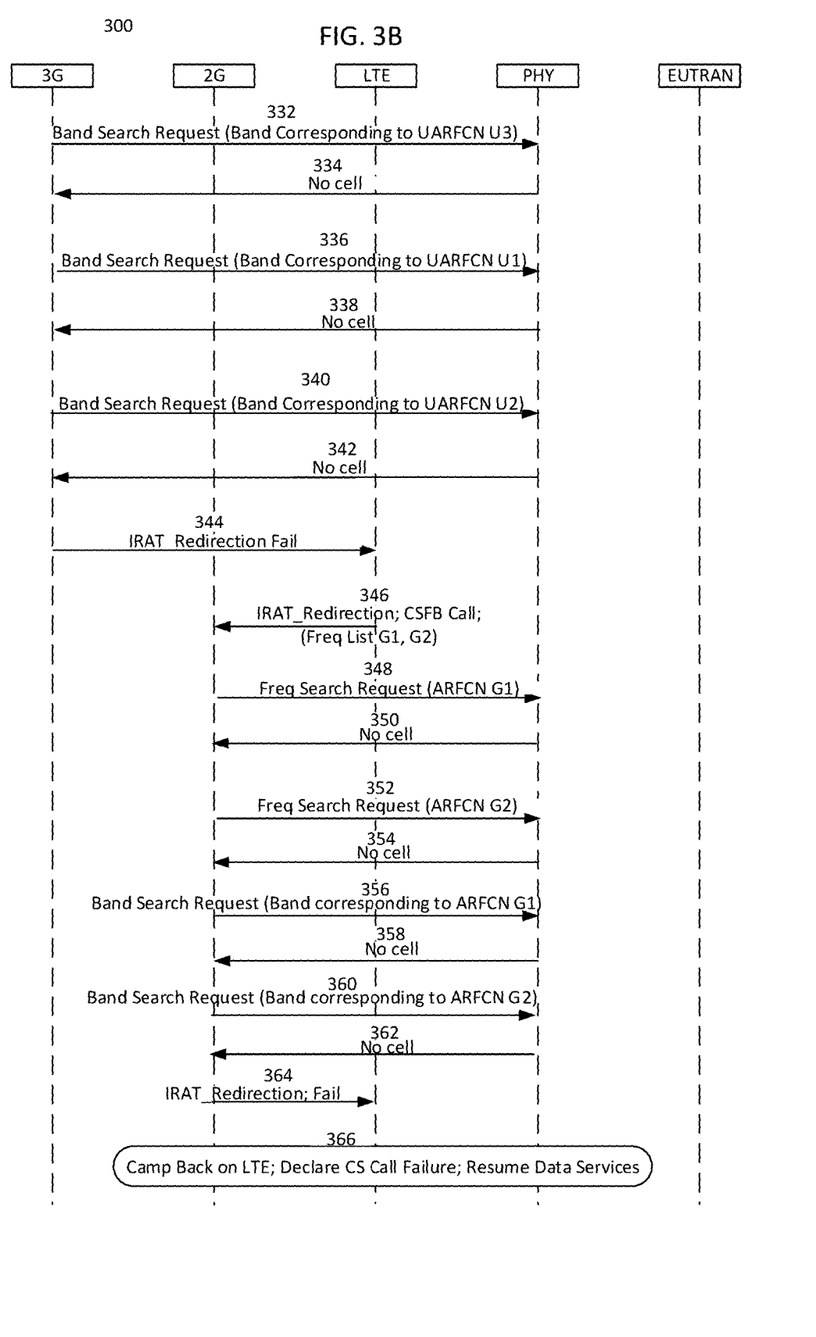
FIG. 3B shows the continuation of the MSC in FIG. 2A in an aspect of this disclosure.

FIG. 3A-3B show a message sequence chart (MSC) 300 displaying a cell search sequence when CSFB to the target RAT frequency fails in an aspect of this disclosure. It is appreciated that MSC 300 is exemplary in nature and may thus be simplified for purposes of explanation.

The 3G, 2G, LTE, and physical (PHY) layers are layers on the mobile terminal (i.e. communication device or UE) while the Evolved Universal Terrestrial Radio Access Network (EUTRAN) is the overall network structure supporting both LTE and legacy RANs.

In MSC 300, the UE starts off in idle mode 302, where it may receive the system information blocks (SIBs) 6 and 7 provided by the EUTRAN. SIB 6 provides UMTS reselection information, e.g. UMTS carrier frequencies; UTRA Absolute Radio Frequency Channel Numbers (UARFCN). SIB 7 provides GSM reselection information, e.g. GSM carrier frequencies; Absolute Radio Frequency Channel Numbers (ARFCN). It should be appreciated that the UE may also be in active mode in the initial stage when the CSFB procedure is started.

Upon receiving a Paging/CS service notification 304 from the EUTRAN, the LTE layer of the UE commences inter RAT (IRAT) frequency measurements 306. The Paging/CS service notification 304 may be triggered by a phone call, for example. The measurements are performed on the legacy RAT frequencies obtained from SIBs 6 and 7 broadcasted by the EUTRAN. UE established connection towards EUTRAN and sends an Extended Service Request 308. The measurement results for each of the legacy RATs are reported back 310-312 to the LTE layer. In this example, frequency U1 of the UMTS RAN (corresponding to 3G) and frequency G1 of the GSM RAN (corresponding to 2G) provide good power levels.

The measurements are performed until the CSFB redirection request, here shown as the RRC Connection Release (redirectedCarrierInfo utra_FDD:U3) 316, is received from the EUTRAN. Upon receipt of the CSFB redirection request 316, the message is forwarded to the component of the appropriate RAT, in this case, the 3G layer, since the request 316 specifies a target frequency U3, a frequency of the 3G RAN. Alternatively, if the request specifies a target frequency on the 2G RAT (e.g. G1), then the request would be forwarded to the 2G component of the UE. The RAT indicated by the network (i.e. EUTRAN) in the RRC Connection Release/RRC Connection Reject will hereinafter be referred to as the "Target RAT."

When CSFB redirection 318 from the LTE (hereinafter, "Source RAT") is triggered, the Source RAT provides the Target RAT with a list of frequencies in descending order of their priority (here shown as U3, U1, U2 in 318). The Source RAT can also start a CSFB_TIMEOUT timer (discussed in FIG. 4A-4B). The following is the order of the frequencies to be searched by the Target RAT: (1) the target frequency/target frequencies in the redirection information provided by the EUTRAN—in this example, this corresponds to U3 320; (2) Target RAT frequencies obtained from the SIBs for which good measurement results are obtained from the IRAT measurements (shown by 306 and 310-314)—in this example, this corresponds to U1 324; and (3) remaining Target RAT frequencies obtained in the SIBs which have not yet been searched—in this example, this may correspond to U2 328 if the redirection request came in before U2 could be measured.

If there are multiple Target RAT frequencies which were acquired from the SIBs for which good measurement results are obtained from the IRAT measurements, these target RAT frequencies may be organized in decreasing power level (i.e. signal strength) order so that the frequency with the strongest power level is searched first.

When searching for frequencies in the above defined order, the UE shall camp on the first found suitable cell. However, in order to further show the order for the UE to search for a suitable legacy RAT for purposes of the aspect of this disclosure, it will be assumed that all three frequency search requests 320, 324, and 328 result in a no suitable cell being found, 322, 326, and 330.

FIG. 3B is a continuation of MSC 300. If no cell can be found in the frequency search of the target RAT shown in 320-330, the UE will then perform a search on the frequency bands (hereinafter, bands) in the following order on the Target RAT (again, the Target RAT is the RAT indicated by the network, i.e. EUTRAN, in the redirectedCarrierInfo message): (1) the bands corresponding to the redirected frequency/frequencies indicated by the network—in this example, this band corresponds to the U3 frequency 332; (2) the bands corresponding to Target RAT frequencies obtained from the SIBs for which good measurement results were obtained from the IRAT measurements—in this example, this band corresponds to the U1 frequency 336; and (3) the bands from the remaining Target RAT frequencies obtained in the SIBs which have not yet been searched—in this example, this corresponds to the U2 frequency 340.

When searching for bands in the above defined order, the UE shall camp on the first found suitable cell. However, in order to further show the order for the UE to search for a suitable legacy RAT for purposes of the aspect of this disclosure, it will be assumed that all three band search requests 332, 336, and 340 result in a no suitable cell being found, 334, 338, and 342.

In no suitable cell is found on the Target RAT in the frequency search of the Target RAT in 320-330 and the band search of the Target RAT in 332-342, then the target RAT (in this case, 3G) will indicate to the Source RAT that the redirection failed 344. This will trigger an IRAT redirection to take the CSFB call 346 to an alternate CS RAT (i.e. another legacy RAT), which in this example, is 2G. Alternatively, if the target RAT frequency from the redirectedCarrierInfo message would have been a 2G frequency, such as G1, then the alternate CS RAT would have been 3G. However, for purposes of this example, 2G is the alternate RAT.

The IRAT redirection to take the CSFB call 346 to the 2G layer contains an alternate RAT frequency list (in this example: G1, G2). This alternate RAT frequency list instructs the UE to perform the frequency scan of the alternate RAT in the following order: (1) the alternate RAT frequencies obtained in the SIBs for which good measurement results are obtained in the IRAT measurements performed in 306 and 310-314—in this example, this corresponds to G1 348; and (2) remaining alternate RAT frequencies obtained from SIBs which haven't yet been searched—in this example, this may correspond to G2 352 if the redirection request came in before G2 could be searched.

When searching for alternate RAT frequencies in the above defined order, the UE shall camp on the first found suitable cell.

If there are multiple alternate RAT frequencies which were acquired from the SIBs for which good measurement results are obtained from the IRAT measurements, these alternate RAT frequencies may be organized in decreasing power level (i.e. signal strength) order so that the frequency with the strongest power level is searched first.

If no cell can be found in the frequency search of the alternate RAT shown in 346-354, the UE will then perform a search on the bands of the alternate RAT in the following order on the alternate RAT: (1) bands corresponding to the alternate RAT frequencies obtained in the SIBs for which good measurement results are obtained in the IRAT measurements performed in 306 and 310-314—in this example, bands corresponding to G1 356; and (2) bands corresponding to remaining alternate RAT frequencies obtained from SIBs which haven't yet been searched—in this example, bands corresponding to G2 360.

When searching for bands of the alternate RAT in the above defined order, the UE shall camp on the first found suitable cell. If no suitable cell is found, 358 and 362, then the IRAT redirection fails 364, and the UE can camp back on LTE and resume data services 366.

Figure 4A:
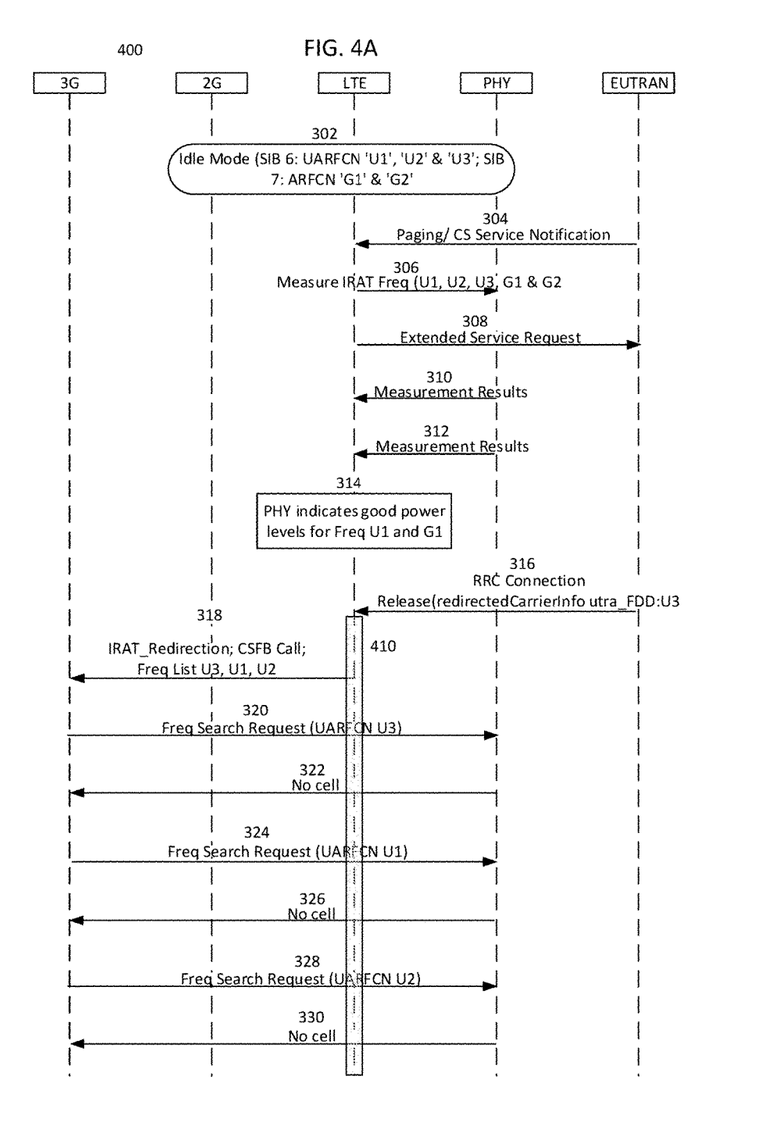
FIG. 4A shows a MSC for falling back to a legacy RAT upon a notification of a CS transmission with a CSFB timer in an aspect of this disclosure.
Figure 4B:
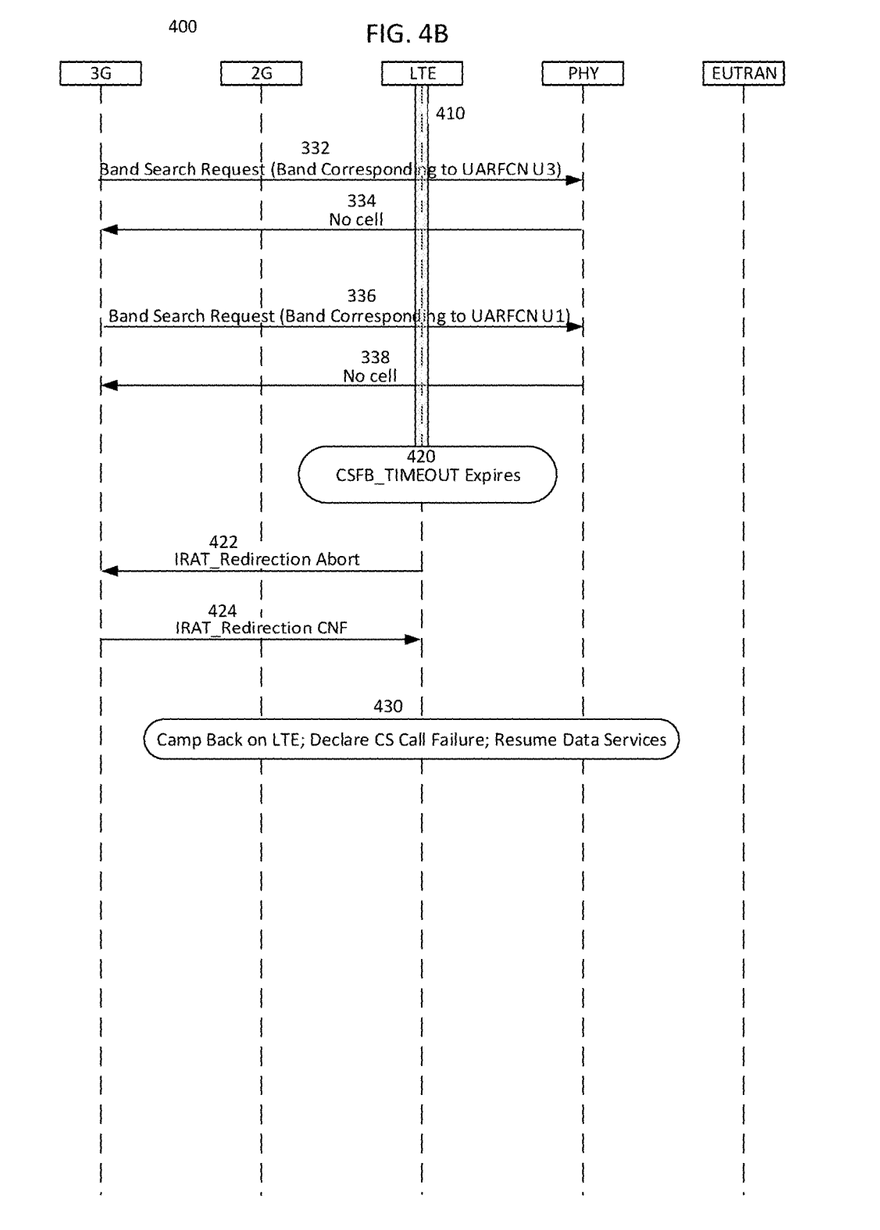
FIG. 4B shows the continuation of the MSC in FIG. 3A in an aspect of this disclosure.

FIG. 4A-4B show a message sequence chart (MSC) 400 displaying a cell search sequence when CSFB to the target RAT frequency fails and with the implementation of a CSFB timer in an aspect of this disclosure. It is appreciated that MSC 400 is exemplary in nature and may thus be simplified for purposes of explanation.

Since FIG. 4A-4B incorporates many of the features of FIG. 3A-3B, the identical features (as demonstrated by the reference numbers) will not be discussed in detail again.

The key feature shown in FIG. 4A-4B is the addition of a CSFB timer 410. The CSFB timer 410 commences when the CSFB redirection from the LTE is triggered in 316. During the time that the CSFB timer 410 is running (as shown by the shaded rectangle 410 on the LTE layer in FIG. 4A-4B), the UE conducts the same process as in FIG. 3A-3B.

However, the CSFB timer 410 is only configured to run for a predetermined amount of time. The CSFB timer 410 is configured to allow for the CSFB search process in FIG. 3A-3B, but if no suitable cell can be found within a reasonable amount of time, the CSFB timer is configured to abort the CSFB search process and redirect the UE back to LTE in order to resume data services. In this manner, the CSFB timer provides the benefit of minimizing the interruption of data services if no suitable cell can be found on the target and/or alternate RAT.

The CSFB timer 410 expires at 420 in FIG. 4B. Upon CSFB expiration, the CSFB process is stopped, regardless of what stage the CSFB search process is at (in this example, after search for the band corresponding to target RAT frequency U1). The IRAT Redirection Abort request 422 is sent to the appropriate destination, in this case, 3G since the search was on 3G on expiration of the CSFB timer, and the IRAT Redirection Confirmation 424 is received by the LTE, at which point the LTE data services may resume 430.

Figure 5:
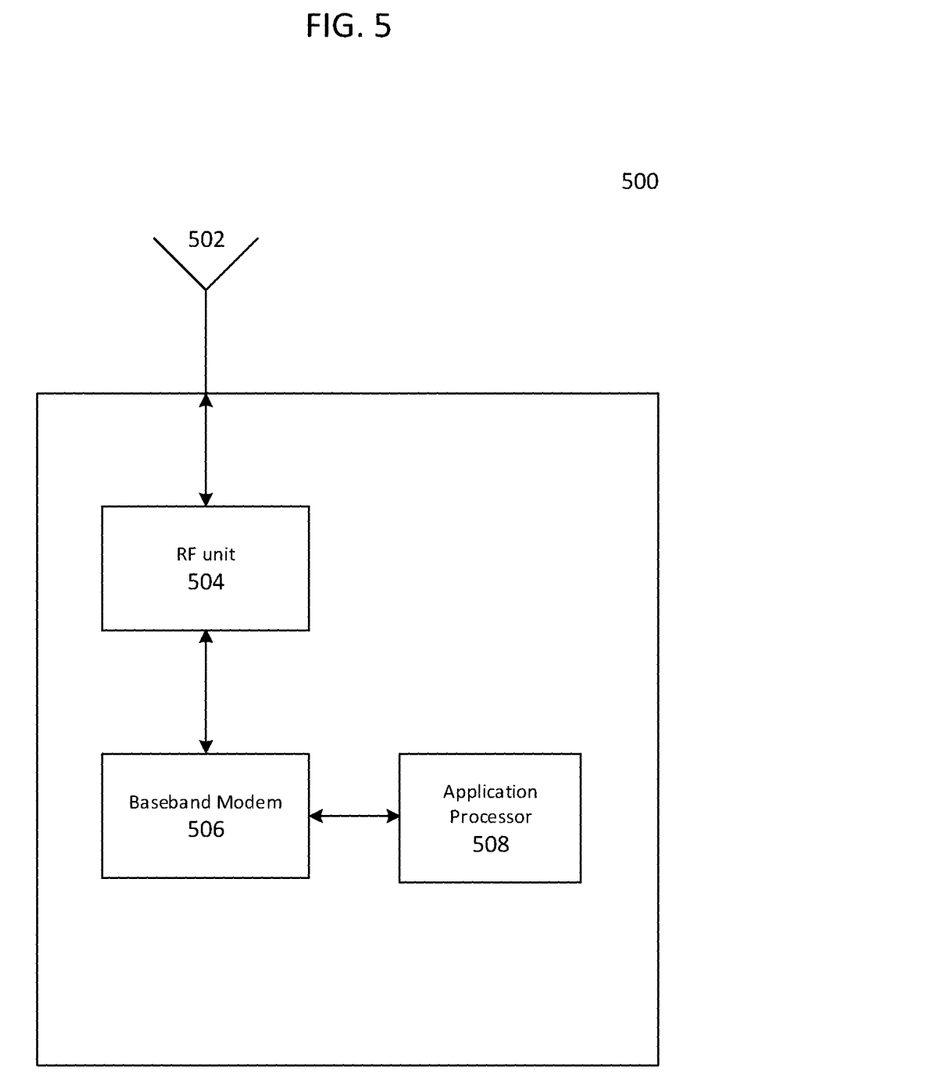
FIG. 5 shows an example of a communication device in an aspect of this disclosure.

FIG. 5 shows a schematic diagram of a mobile terminal 500 according to one aspect of this disclosure. Mobile terminal 500 is configured to expedite CSFB call setup time upon failure of CSFB to the target RAT. It is appreciated that mobile terminal 500 is exemplary in nature and may thus be simplified for purposes of explanation.

As shown in FIG. 5, mobile terminal 500 may include an antenna 502, radio frequency (RF) unit 504 (i.e. RF transceiver), baseband modem 506, and application processor 508. As shown in FIG. 5, these components may be implemented as separate components. However, as depicted in FIG. 5, it is appreciated that the configuration of mobile terminal 500 is for purposes of explanation, and accordingly, one or more of the aforementioned components of mobile terminal 500 may be integrated into a single equivalent component or divided into multiple components with collective equivalence. It is also appreciated that mobile terminal 500 may have one or more additional components, such as hardware, software, or firmware elements. For example, mobile terminal 500 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. The at least one memory component of mobile terminal 500 may be configured to store program instructions. The mobile terminal 500 may have a non-transitory computer readable medium for storing program instructions for causing a processor to execute the program instructions. Mobile terminal 500 may also include a variety of user input/output devices, such as display(s), keypad(s), touchscreen(s), speaker(s), microphone(s), button(s), camera(s), etc.

In an overview of the operation of mobile terminal 500, mobile terminal 500 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of mobile terminal 500 may be shared between different wireless access protocols, such as, for example, by sharing an antenna 502 between multiple different wireless access protocols or RATs. In an exemplary aspect of this disclosure, RF unit 504 and/or baseband modem 506 may operate according to multiple communication access protocols (i.e. "multi-mode"), and thus may be configured to support one or more of LTE, GSM, and/or UMTS access protocols.

Furthermore, RF unit 504 may receive frequency wireless signals via antenna 1102, which may be implemented as, for example, a single antenna or an antenna array composed of multiple antennas. RF unit 504 may include various reception circuitry elements, for example, analog circuitry configured to process externally received signals, such as circuitry to convert externally received RF signals to baseband and/or intermediate frequencies. RF unit 504 may also include amplification circuitry to amplify externally received signals, such power amplifiers and/or Low Noise Amplifies, although it is appreciated that such components may also implemented separately. RF unit 504 may additionally include various transmission circuit elements configured to transmit signals, such as, for example, baseband and/or intermediate frequency signals provided by the baseband modem 506, which may include mixing circuitry to modulate signals onto one or more radio frequency carrier waves and/or amplification circuitry to amplify internal signals before transmission. The RF unit 504 may provide such signals to antenna 502 for wireless transmission. Although not explicitly depicted in FIG. 5, RF unit 504 may be additionally connected to application processor 508.

Baseband modem 506 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 506 and may also be partially or fully integrated with the digital processing circuitry.

The baseband modem 506 may be configured to operate one or more protocol stacks, such as a GSM protocol stack, an LTE protocol stack, a UMTS protocol stack, etc. or any combination thereof. Baseband modem 506 may be multi-mode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 506 may be configured to control one or more further components of mobile terminal 500. The protocol stack(s) of baseband modem 506 may be configured to control operation of the baseband modem 506, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 506 may be detailed herein substantially in terms of functional operation in recognition that a person of skill in the art may readily appreciate the various possible structural realizations of baseband modem 506 using digital processing circuitry that will provide the desired functionality.

In an exemplary aspect of the disclosure, the baseband modem is configured to obtain selected frequencies from the network (e.g. IRAT frequencies obtained from SIBs broadcasted by EUTRAN), receive a CSFB for CS Services, measure the selected frequencies (e.g. the IRAT frequencies obtained from the SIBs) for their respective power levels until a CSFB redirection request containing a target RAT frequency is received, organize the measured selected frequencies in order of decreasing power level, and attempt to connect to the target RAT according to a frequency list in the following order: the target RAT frequency in the CSFB redirection request; the measured selected frequencies (e.g. the measured IRAT frequencies obtained from the SIBs) corresponding to the target RAT in order of decreasing power level; and selected frequencies corresponding to the target RAT which were not measured (e.g. other IRAT frequencies obtained from the SIBs).

The baseband modem may be further configured to attempt to connect to the target RAT according to a band list in the following order: the bands corresponding to the target frequency in the CSFB redirection request; the bands corresponding to the measured selected frequencies (e.g. the measured IRAT frequencies obtained from the SIBs) corresponding to the target RAT in order of decreasing power level; and the bands corresponding to the selected frequencies corresponding to the target RAT which were not measured (e.g. other IRAT frequencies obtained from the SIBs).

The baseband modem may be further configured to attempt to connect to an alternate RAT providing CS service according to the alternate RAT frequency list in the following order: the measured selected frequencies corresponding to the alternate RAT in order of decreasing power level; and selected frequencies corresponding to the alternate RAT which were not measured.

The baseband modem may be further configured to attempt to connect to an alternate RAT providing CS service according to the alternate RAT band list in the following order: the bands corresponding to the measured selected frequencies corresponding to the alternate RAT in order of decreasing power level; and the bands corresponding to the remaining selected frequencies corresponding to the alternate RAT which were not measured.

The application processor 508 may be implemented as a Central Processing Unit (CPU), and may function as a controller of mobile terminal 500. The application processor 508 may be configured to execute various applications and/or programs of mobile terminal 500, such as, for example, applications corresponding to program code stored in a memory component of mobile terminal 500 (not shown in FIG. 5). The application processor 508 may also be configured to control one or more further components of mobile terminal 500, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 506 and application processor 508 are depicted separately in FIG. 5, it is appreciated that the figure is not limiting in nature. It is understood that the baseband modem 506 and the application processor 508 may be implemented separately, implemented together (i.e. as an integrated unit), partially implemented together, etc.

Figure 6:
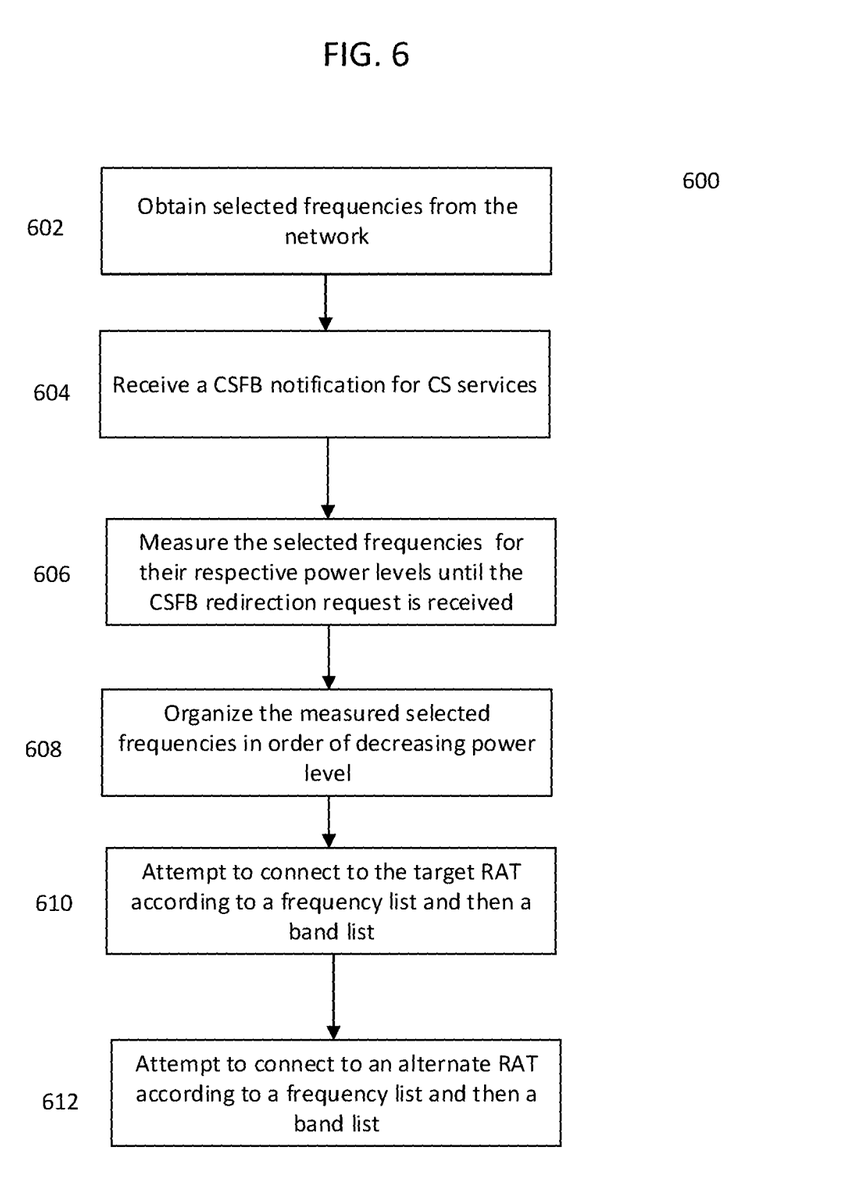
FIG. 6 shows an exemplary flowchart in an aspect of this disclosure.

FIG. 6 shows an exemplary flowchart 600 in an aspect of this disclosure. It is appreciated that flowchart 600 is exemplary in nature and may thus be simplified for purposes of explanation.

In 602, the communication device obtains selected frequencies from the network. These selected frequencies may be IRAT frequencies obtained from SIBs (e.g. SIB 6 for UMTS, SIB 7 for GSM, SIB 8 for cdma2000) broadcasted by EUTRAN. In 604, the communication device receives a CSFB for CS services. Upon receiving this notification, the communication device will trigger measurements of the selected frequencies (e.g. the IRAT frequencies obtained from the SIBs broadcasted by EUTRAN) and obtain results containing the power levels of the measured selected frequencies (e.g. the IRAT frequencies which were measured) 606. The communication device will continue these measurements until the CSFB redirection request is received. The CSFB redirection request from the network (i.e. EUTRAN) contains information about the target RAT and target RAT frequency(s). In other words, the CSFB redirection request will indicate the target RAT and further specify at least one frequency on the target RAT. In 608, the communication device may organize the measured selected frequencies (e.g. the measured IRAT frequencies from the SIBs) in order of decreasing power level. Alternatively, 608 may be incorporated into 606 so that the communication device organizes the frequencies by power levels as it conducts the measurements. In 610, the communication device will attempt to connect to the target RAT according to a frequency list detailed in this disclosure. If this does not result in a successful connection, the communication device will attempt to connect to the target RAT according to a band list detailed in this disclosure. If this also does not result in a successful connection, the communication device may be configured to attempt to connect to an alternate RAT supporting CS services according to a frequency list and then a band list 612 as detailed in this disclosure.

In Example 1, a method for a communication device to perform a circuit switch fallback (CSFB) on a network, comprising: obtaining selected frequencies from the network; receiving a CSFB notification for circuit switched (CS) services; measuring the selected frequencies for their respective power levels until a CSFB redirection request to switch from a source radio access technology (RAT) to a target RAT comprising a target RAT frequency is received; ordering the measured selected frequencies in order of decreasing power level; attempting to connect to the target RAT according to a frequency list in the following order: the target RAT frequency in the CSFB redirection request; the measured selected frequencies corresponding to the target RAT in order of decreasing power level; and selected frequencies corresponding to the target RAT which were not measured.

In Example 2, the subject matter of example 1, the network comprising an Evolved Universal Terrestrial Radio Access Network (EUTRAN).

In Example 3, the subject matter of any one of examples 1-2, further comprising triggering the CSFB notification with a phone call.

In Example 4, the subject matter of any one of examples 1-3, wherein the source RAT is the long term evolution (LTE).

In Example 5, the subject matter of any one of examples 1-4, wherein the target RAT is a third generation (3G) or second generation (2G) RAT.

In Example 6, the subject matter of example 5, wherein the 3G RAT comprises Universal Mobile Telecommunications System (UMTS).

In Example 7, the subject matter of any one of examples 5-6, wherein the 2G RAT comprises Global System for Mobile Communications (GSM).

In Example 8, the subject matter of any one of examples 1-7, the selected frequencies comprising inter radio access technology (IRAT) frequencies received in system information blocks (SIBs) broadcasted by the network.

In Example 9, the subject matter of example 8, further comprising the sixth SIB (SIB 6) providing IRAT frequencies for comprises Universal Mobile Telecommunications System (UMTS) and the seventh SIB (SIB 7) providing IRAT frequencies for Global System for Mobile Communications (GSM).

In Example 10, the subject matter of any one of examples 1-9, wherein the network sends the CSFB redirection request.

In Example 11 the subject matter of any one of examples 1-10, further comprising sending an extended service request to the network.

In Example 12, the subject matter of any one of examples 1-11, further comprising connecting to the target RAT via a frequency providing a first suitable connection. A suitable connection for purposes of this disclosure (i.e. anything preceding or anything following) is any connection that will provide the communication device with the desired wireless services (e.g. internet access, telecommunication, etc).

In Example 13, the subject matter of any one of examples 1-11, further comprising attempting to connect to the target RAT, where said attempting to connect to the target RAT according to the frequency list fails to establish a connection, according to a band list in the following order: the bands corresponding to the target frequency in the CSFB redirection request; the bands corresponding to the measured selected frequencies corresponding to the target RAT in order of decreasing power level; and the bands corresponding to the selected frequencies corresponding to the target RAT which were not measured.

In Example 14, the subject matter of example 13, further comprising connecting to the target RAT via the band providing a first suitable connection.

In Example 15, the subject matter of example 13, further comprising attempting to connect to an alternate RAT supporting CS services, where said attempting to connect to the target RAT according to the band list fails to establish a connection, according to an alternate RAT frequency list in the following order: the measured selected frequencies corresponding to the alternate RAT in order of decreasing power level; and selected frequencies corresponding to the alternate RAT which were not measured.

In Example 16, the subject matter of example 15, further comprising connecting to the alternate RAT supporting CS services via a frequency providing a first suitable connection.

In Example 17, the subject matter of example 15, further comprising attempting to connect to the alternate RAT supporting CS services, where said attempting to connect to the alternate RAT supporting CS services according to the alternate RAT frequency list fails to establish a connection, according to an alternate RAT band list in the following order: the bands corresponding to the measured selected frequencies corresponding to the alternate RAT in order of decreasing power level; and the bands corresponding to the remaining selected frequencies corresponding to the alternate RAT which were not measured.

In Example 18, the subject matter of example 17, further comprising connecting to the alternate RAT supporting CS services via the band providing a first suitable connection.

In Example 19, the subject matter of example 17, further comprising connecting back to the source RAT if there is no suitable connection.

In Example 20, the subject matter of any one of examples 1-18, the CSFB redirection request further comprising starting a CSFB timer.

In Example 21, the subject matter of any one of examples, further comprising aborting the CSFB upon the termination of the CSFB timer.

In Example 22, the subject matter of example 21, further comprising connecting back to the source RAT.

In Example 23, a communication device configured to perform a circuit switch fallback (CSFB) on a network, comprising: a radio frequency (RF) unit configured to communicate with the network; a baseband modem configured to: obtain selected frequencies from the network; receive a CSFB notification for circuit switched (CS) services; measure the selected frequencies for their respective power levels until a CSFB redirection request to switch from a source radio access technology (RAT) to a target RAT comprising a target RAT frequency is received; order the measured selected frequencies in order of decreasing power level; attempt to connect to the target RAT according to a frequency list in the following order: the target RAT frequency in the CSFB redirection request; the measured selected frequencies corresponding to the target RAT in order of decreasing power level; and selected frequencies corresponding to the target RAT which were not measured.

In Example 24, the subject matter of example 23, the RF unit further configured to communicate with an Evolved Universal Terrestrial Radio Access Network (EUTRAN).

In Example 25, the subject matter of any one of examples 23-24, the RF unit further configured to communicate with a long term evolution (LTE) radio access network (RAN).

In Example 26, the subject matter of any one of examples 23-25, the RF unit further configured to communicate with a Universal Mobile Telecommunications System (UMTS) RAN.

In Example 27, the subject matter of any one of examples 23-26, the RF unit further configured to communicate with a Global System for Mobile Communications (GSM) RAN.

In Example 28, the subject matter of any one of examples 23-27, the baseband modem further configured to obtain the selected frequencies as inter RAT (IRAT) frequencies from system information blocks (SIBs) broadcasted by the network.

In Example 29, the subject matter of any one of examples 23-28, the baseband modem further configured to send an extended service request to the network.

In Example 30, the subject matter of any one of examples 23-29, the baseband modem further configured to connect the communication device with the target RAT via a frequency providing a first suitable connection.

In Example 31, the subject matter of any one of examples 23-29, the baseband modem further configured to attempt to connect to the target RAT, where said attempt to connect to the target RAT according to the frequency list fails to establish a connection, according to a band list in the following order: the bands corresponding to the target frequency in the CSFB redirection request; the bands corresponding to the measured selected frequencies corresponding to the target RAT in order of decreasing power level; and the bands corresponding to the selected frequencies corresponding to the target RAT which were not measured.

In Example 32, the subject matter of example 31, the baseband modem further configured to connect the communication device to the target RAT via the band providing a first suitable connection.

In Example 33, the subject matter of example 31, the baseband modem further configured to attempt to connect to an alternate RAT supporting CS services, where said attempt to connect to the target RAT according to the band list fails to establish a connection, according to an alternate RAT frequency list in the following order: the measured selected frequencies corresponding to the alternate RAT in order of decreasing power level; and selected frequencies corresponding to the alternate RAT which were not measured.

In Example 34, the subject matter of example 33, the baseband modem further configured to connect the communication device to the alternate RAT supporting CS services via a frequency providing a first suitable connection.

In Example 35, the subject matter of example 33, the baseband modem further configured to attempt to connect to the alternate RAT supporting CS services, where said attempting to connect to the alternate RAT supporting CS services according to the alternate RAT frequency list fails to establish a connection, according to an alternate RAT band list in the following order: the bands corresponding to the measured selected frequencies corresponding to the alternate RAT in order of decreasing power level; and the bands corresponding to the remaining selected frequencies corresponding to the alternate RAT which were not measured.

In Example 36, the subject matter of example 35, the baseband modem further configured to connect the communication device to the alternate RAT supporting CS services via the band providing a first suitable connection.

In Example 37, the subject matter of example 35, the baseband modem further configured to connect back to the source RAT if there is no suitable connection.

In Example 38, the subject matter of any one of examples 23-37, the baseband modem further configured to initiate a CSFB timer upon receipt of the CSFB redirection request.

In Example 39, the subject matter of example 38, the baseband modem further configured to run the CSFB timer while attempting to connect to the target RAT or the alternate RAT supporting CS services.

In Example 40, the subject matter of any one of examples 38-39, the baseband modem further configured to abort the CSFB upon termination of the CSFB timer.

In Example 41, the subject matter of example 40, the baseband modem further configured to connect back to the source RAT.

In Example 42, a non-transitory computer readable medium with program instructions to cause a communication device to perform a circuit switch fallback (CSFB) on a network, comprising: obtaining selected frequencies from the network; receiving a CSFB notification for circuit switched (CS) services; measuring the selected frequencies for their respective power levels until a CSFB redirection request to switch from a source radio access technology (RAT) to a target RAT comprising a target RAT frequency is received; ordering the measured selected frequencies in order of decreasing power level; attempting to connect to the target RAT according to a frequency list in the following order: the target RAT frequency in the CSFB redirection request; the measured selected frequencies corresponding to the target RAT in order of decreasing power level; and selected frequencies corresponding to the target RAT which were not measured.

In Example 43, the subject matter of example 42, the network comprising an Evolved Universal Terrestrial Radio Access Network (EUTRAN).

In Example 44, the subject matter of any one of examples 42-43, further comprising triggering the CSFB notification with a phone call.

In Example 45, the subject matter of any one of examples 42-44, wherein the source RAT is the long term evolution (LTE).

In Example 46, the subject matter of any one of examples 42-45, wherein the target RAT is a third generation (3G) or second generation (2G) RAT.

In Example 47, the subject matter of example 46, wherein the 3G RAT comprises Universal Mobile Telecommunications System (UMTS).

In Example 48, the subject matter of any one of examples 46-47, wherein the 2G RAT comprises Global System for Mobile Communications (GSM).

In Example 49, the subject matter of any one of examples 42-49, the selected frequencies comprising inter radio access technology (IRAT) frequencies received in system information blocks (SIBs) broadcasted by the network.

In Example 50, the subject matter of example 49, further comprising the sixth SIB (SIB 6) providing IRAT frequencies for comprises Universal Mobile Telecommunications System (UMTS) and the seventh SIB (SIB 7) providing IRAT frequencies for Global System for Mobile Communications (GSM).

In Example 51, the subject matter of any one of examples 42-50, wherein the network sends the CSFB redirection request.

In Example 52, the subject matter of any one of examples 42-51, further comprising sending an extended service request to the network.

In Example 53, the subject matter of any one of examples 42-52, further comprising connecting to the target RAT via a frequency providing a first suitable connection.

In Example 54, the subject matter of any one of examples 42-52, further comprising attempting to connect to the target RAT, where said attempting to connect to the target RAT according to the frequency list fails to establish a connection, according to a band list in the following order: the bands corresponding to the target frequency in the CSFB redirection request; the bands corresponding to the measured selected frequencies corresponding to the target RAT in order of decreasing power level; and the bands corresponding to the selected frequencies corresponding to the target RAT which were not measured.

In Example 55, the subject matter of example 54, further comprising connecting to the target RAT via the band providing a first suitable connection.

In Example 56, the subject matter of example 54, further comprising attempting to connect to an alternate RAT supporting CS services, where said attempting to connect to the target RAT according to the band list fails to establish a connection, according to an alternate RAT frequency list in the following order: the measured selected frequencies corresponding to the alternate RAT in order of decreasing power level; and selected frequencies corresponding to the alternate RAT which were not measured.

In Example 57, the subject matter of example 56, further comprising connecting to the alternate RAT supporting CS services via a frequency providing a first suitable connection.

In Example 58, the subject matter of example 56, further comprising attempting to connect to the alternate RAT supporting CS services, where said attempting to connect to the alternate RAT supporting CS services according to the alternate RAT frequency list fails to establish a connection, according to an alternate RAT band list in the following order: the bands corresponding to the measured selected frequencies corresponding to the alternate RAT in order of decreasing power level; and the bands corresponding to the remaining selected frequencies corresponding to the alternate RAT which were not measured.

In Example 59, the subject matter of example 58, further comprising connecting to the alternate RAT supporting CS services via the band providing a first suitable connection.

In Example 60, the subject matter of example 58, further comprising connecting back to the source RAT if there is no suitable connection.

In Example 61, the subject matter of any one of examples 42-60, the CSFB redirection request further comprising starting a CSFB timer.

In Example 62 the subject matter of example 61, further comprising aborting the CSFB upon the termination of the CSFB timer.

In Example 63, the subject matter of example 62, further comprising connecting back to the source RAT.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device configured to perform a circuit switch fallback (CSFB) on a network, comprising:
   a radio frequency (RF) unit configured to communicate with the network;
   a baseband modem configured to:
      obtain selected frequencies from the network;
      receive a CSFB notification for circuit switched (CS) services;
      measure the selected frequencies for their respective power levels until a CSFB redirection request to switch from a source radio access technology (RAT) to a target RAT comprising a target RAT frequency is received by the communication device;
      order the measured selected frequencies in order of decreasing power level;
      attempt to connect to the target RAT according to a frequency list in the following order:
         the target RAT frequency in the CSFB redirection request;
         the measured selected frequencies corresponding to the target RAT in order of decreasing power level; and
         selected frequencies corresponding to the target RAT which were not measured.

2. The communication device of claim 1, the baseband modem further configured to obtain the selected frequencies as inter RAT (IRAT) frequencies from system information blocks (SIBS) broadcasted by the network.

3. The communication device of claim 1, the baseband modem further configured to connect the communication device with the target RAT via a frequency from the frequency list providing a first suitable connection.

4. The communication device of claim 1, the baseband modem further configured to attempt to connect to the target RAT, where said attempt to connect to the target RAT according to the frequency list fails to establish a connection, according to a band list in the following order:
   the bands corresponding to the target frequency in the CSFB redirection request;
   the bands corresponding to the measured selected frequencies corresponding to the target RAT in order of decreasing power level; and
   the bands corresponding to the selected frequencies corresponding to the target RAT which were not measured.

5. The communication device of claim 4, the baseband modem further configured to attempt to connect to an alternate RAT supporting CS services, where said attempt to connect to the target RAT according to the band list fails to establish a connection, according to an alternate RAT frequency list in the following order:
   the measured selected frequencies corresponding to the alternate RAT in order of decreasing power level; and
   selected frequencies corresponding to the alternate RAT which were not measured.

6. The communication device of claim 5, the baseband modem further configured to connect the communication device to the alternate RAT supporting CS services via a frequency providing a first suitable connection.

7. The communication device of claim 5, the baseband modem further configured to attempt to connect to the alternate RAT supporting CS services, where said attempting to connect to the alternate RAT supporting CS services according to the alternate RAT frequency list fails to establish a connection, according to an alternate RAT band list in the following order:
   the bands corresponding to the measured selected frequencies corresponding to the alternate RAT in order of decreasing power level; and
   the bands corresponding to the remaining selected frequencies corresponding to the alternate RAT which were not measured.

8. The communication device of claim 7, the baseband modem further configured to connect the communication device to the alternate RAT supporting CS services via the band providing a first suitable connection.

9. The communication device of claim 7, the baseband modem further configured to connect back to the source RAT if there is no suitable connection.

10. The communication device of claim 4, the baseband modem further configured to connect the communication device to the target RAT via a band providing a first suitable connection.

11. The communication device of claim 1, the baseband modem further configured to initiate a CSFB timer upon receipt of the CSFB redirection request.

12. The communication device of claim 11, the baseband modem further configured to abort the CSFB upon termination of the CSFB timer.

13. The communication device of claim 1, wherein the CSFB redirection request comprises one or more additional target RAT frequencies, and an attempt to connect to the target RAT on the one or more additional target RAT frequencies is performed prior to an attempt to connect to the measured selected frequencies.

14. A method for a communication device to perform a circuit switch fallback (CSFB) on a network, comprising:
  obtaining selected frequencies from the network;
  detecting a CSFB notification for circuit switched (CS) services;
  in response to an arrival of the CSFB notification for CS services, performing measurements of the selected frequencies for their respective power levels until a CSFB redirection request to switch from a source radio access technology (RAT) to a target RAT comprising a target RAT frequency is received by the communication device;
  ordering the measured selected frequencies in order of decreasing power level;
  attempting to connect to the target RAT according to a frequency list in the following order:
    the target RAT frequency in the CSFB redirection request;
    the measured selected frequencies corresponding to the target RAT in order of decreasing power level; and
    selected frequencies corresponding to the target RAT which were not measured.

15. The method of claim 14, the selected frequencies comprising inter radio access technology (IRAT) frequencies received in system information blocks (SIBs) broadcasted by the network.

16. The method of claim 14, further comprising attempting to connect to the target RAT, where said attempting to connect to the target RAT according to the frequency list fails to establish a connection, according to a band list in the following order:
  the bands corresponding to the target frequency in the CSFB redirection request;
  the bands corresponding to the measured selected frequencies corresponding to the target RAT in order of decreasing power level; and
  the bands corresponding to the selected frequencies corresponding to the target RAT which were not measured.

17. The method of claim 16, further comprising attempting to connect to an alternate RAT supporting CS services, where said attempting to connect to the target RAT according to the band list fails to establish a connection, according to an alternate RAT frequency list in the following order:
  the measured selected frequencies corresponding to the alternate RAT in order of decreasing power level; and
  selected frequencies corresponding to the alternate RAT which were not measured.

18. The method of claim 17, further comprising attempting to connect to the alternate RAT supporting CS services, where said attempting to connect to the alternate RAT supporting CS services according to the alternate RAT frequency list fails to establish a connection, according to an alternate RAT band list in the following order:
  the bands corresponding to the measured selected frequencies corresponding to the alternate RAT in order of decreasing power level; and
  the bands corresponding to the remaining selected frequencies corresponding to the alternate RAT which were not measured.

19. A non-transitory computer readable medium with program instructions to cause a communication device to perform a circuit switch fallback (CSFB) on a network, comprising:
  obtaining selected frequencies from the network;
  receiving a CSFB notification for circuit switched (CS) services;
  measuring the selected frequencies for their respective power levels until a CSFB redirection request to switch from a source radio access technology (RAT) to a target RAT comprising a target RAT frequency is received by the communication device;
  ordering the measured selected frequencies in order of decreasing power level;
  attempting to connect to the target RAT according to a frequency list in the following order:
    the target RAT frequency in the CSFB redirection request;
    the measured selected frequencies corresponding to the target RAT in order of decreasing power level; and
    selected frequencies corresponding to the target RAT which were not measured.

20. The non-transitory computer readable medium of claim 19, the selected frequencies comprising inter radio access technology (IRAT) frequencies received in system information blocks (SIBS) broadcasted by the network.

21. The non-transitory computer readable medium of claim 19, further comprising attempting to connect to the target RAT, where said attempting to connect to the target RAT according to the frequency list fails to establish a connection, according to a band list in the following order:
  the bands corresponding to the target frequency in the CSFB redirection request;
  the bands corresponding to the measured selected frequencies corresponding to the target RAT in order of decreasing power level; and
  the bands corresponding to the selected frequencies corresponding to the target RAT which were not measured.

22. The non-transitory computer readable medium of claim 21, further comprising attempting to connect to an alternate RAT supporting CS services, where said attempting to connect to the target RAT according to the band list fails to establish a connection, according to an alternate RAT frequency list in the following order:
  the measured selected frequencies corresponding to the alternate RAT in order of decreasing power level; and
  selected frequencies corresponding to the alternate RAT which were not measured.

23. The non-transitory computer readable medium of claim 22, further comprising attempting to connect to the alternate RAT supporting CS services, where said attempting to connect to the alternate RAT supporting CS services according to the alternate RAT frequency list fails to establish a connection, according to an alternate RAT band list in the following order:
  the bands corresponding to the measured selected frequencies corresponding to the alternate RAT in order of decreasing power level; and the bands corresponding to the remaining selected frequencies corresponding to the alternate RAT which were not measured.

* * * * *